July 3, 1951 E. O. MARTINSON 2,559,307
BATCHER CONTROL MECHANISM
Filed March 18, 1946 3 Sheets-Sheet 1

INVENTOR
Edwin O. Martinson
Carlson, Pitzner, Hubbard & Wolfe
ATTORNEYS

Patented July 3, 1951

2,559,307

UNITED STATES PATENT OFFICE 2,559,307

BATCHER CONTROL MECHANISM

Edwin O. Martinson, Champaign, Ill., assignor to The C. S. Johnson Company, Champaign, Ill., a corporation of Illinois Application March 18, 1946, Serial No. 655,344

28 Claims. (Cl. 249—14)

The present invention pertains to a batcher control mechanism and has particular although not exclusive utility as applied to the batching of constituents for concrete.

One object of the invention is to provide such a mechanism capable of causing the batcher to deliver material automatically in any selected one of a preset series of proportions.

It is another object of the invention to provide a batcher control mechanism for use in batching concrete constituents which is particularly adapted for quantity production of concrete either in consecutive batches of the same proportions or of a selected one of a predetermined group of proportions or mixes without necessity for performing any calculations and with a minimum of care and attention on the part of an operator. The weighing of an individual batch is accomplished quickly and efficiently, the batch control mechanism being particularly adapted for the simultaneous deposition and weighing of each constituent.

A further object of the invention is to produce an automatic batcher control mechanism of high accuracy enabling the economical production of concrete of accurately predetermined characteristics.

It is still another object of the present invention to provide a batching control which is sufficiently straightforward to be easily understood by an operator having a limited amount of mechanical knowledge. The device is readily assembled and disassembled, and easily kept in repair in spite of operation in the heavily dust-laden atmosphere peculiar to concrete mixing installations.

It is a still further object of this invention to provide a compact central batcher control which is readily transported, and which has components consolidated in a manner to enable the recording of the weights of the constituents on a single sheet of recording paper without the necessity of complicated recording arm linkages. Despite its compactness, the novel orientation of components enables the use of large dials promoting rapid accurate readings.

It is yet another object of the present invention to enable the control of remotely located weighing or measuring devices located at a considerable distance and at any desired angle from the central control station.

It is an object of the invention to produce means for the control of high speed dispensing and weighing apparatus which is protected against the possible maloperation of the switches controlling the discharge of materials onto the weighing scale.

Further objects and advantages of the invention will become apparent as the following description proceeds, taken in connection with the accompanying drawings in which.

Control mechanism constructed in accordance with my teachings is susceptible of various modifications and alternative constructions, and I have shown in detail in the drawings and will herein describe in detail a preferred embodiment only. It is to be understood that I do not thereby intend to limit the invention to the specific form disclosed but intend to cover all modifications and alternative constructions falling within the spirit and scope of the invention as expressed in the appended claims.

*General organization of mechanism*

Referring more particularly to the exemplary embodiment herein illustrated, the batcher control mechanism is shown (Fig. 1) as housed in a cabinet 20 which may be situated at any convenient point near the batcher which it is desired to control. The batcher with its weighing and cut-off mechanism is not shown (except for the diagrammatic illustration of Fig. 7) since such instrumentalities are well known in the art. For the present suffice it to say that the batcher to be controlled is designed to weigh and dispense the sand, water, dry cement and aggregates later mixed to form the concrete. The beams of the various scales used in such weighing, one for each constituent, are attached to pull rods, the tug exerted on each pull rod being a measure of the weight of the material deposited on the scale. The cut-off device associated with each scale may take the form of a power-operated valve or gate which may be electrically controlled to cut off the flow of the bulk ingredient from a storage bin to the weighing scale.

In brief, the control mechanism in the cabinet 20 is such as to indicate and record the quantity of material on each of the associated scales and to automatically stop the flow of material to each of said scales when the amount of material deposited on the scale reaches a predetermined value. In addition, the control mechanism includes a "mix selector," designated generally as 30, to select the proportions of the ingredients desired for a given predetermined concrete mix.

The cabinet 20 contains a number of control assemblies, one for each material or constituent, each assembly including primarily an indicating dial, a recorder, and a cut-off control switch. The assemblies are preferably of uniform construction; accordingly, a description of one will suffice for all. In the discussion that follows the control mechanism for controlling the weighing of sand will be described in detail; and the adjacent mechanism to control the weighing of water, having like parts designated by the suffix "a," will be described in so far as it is necessary to show the cooperation between the two.

Figures 1, 2, 8:
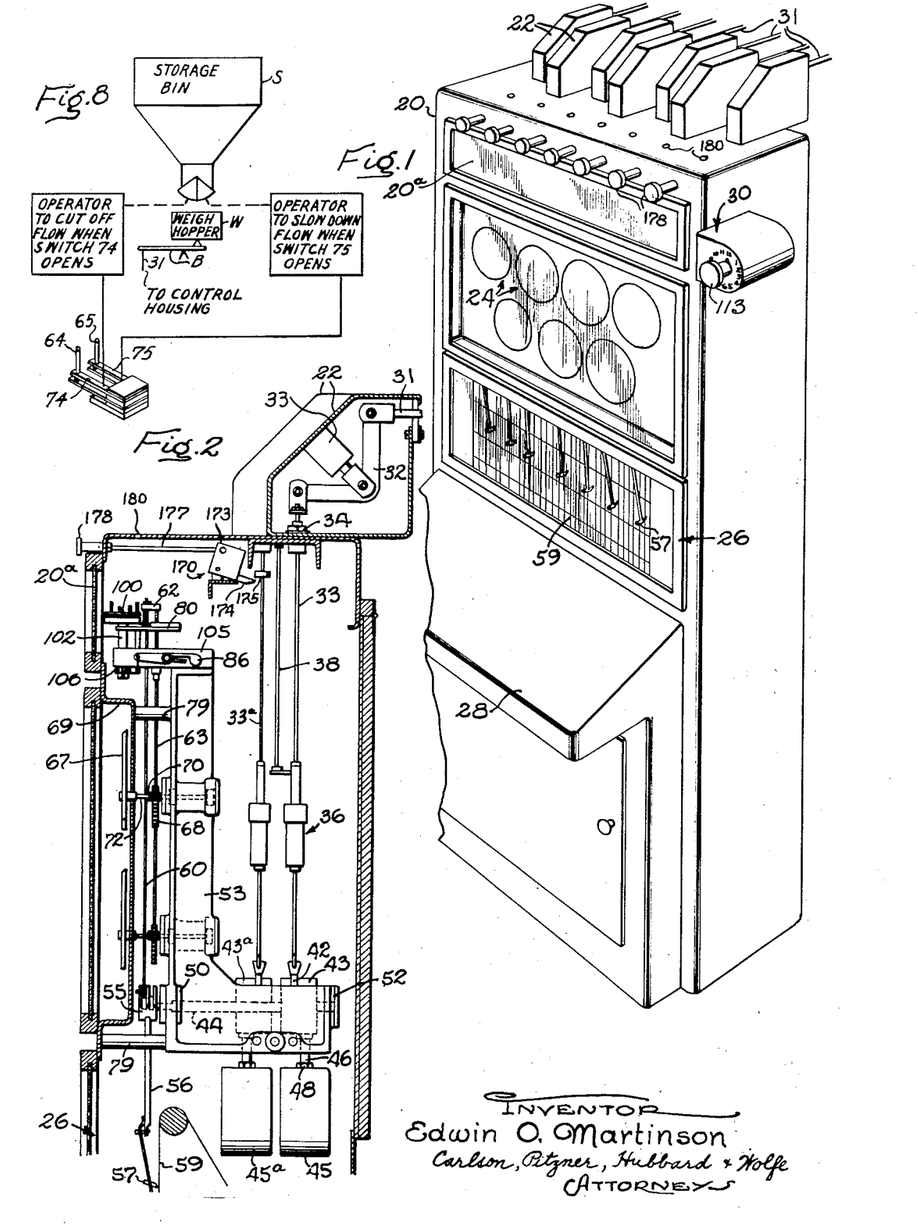
Figure 1 is an external view of a batcher control station constructed in accordance with my invention, showing the method of entry of the linkages from the weighing stations.
Fig. 2 is a sectional view showing the components mounted in the upper portion of the control station.
Fig. 8 is a diagram to show schematically the relation between one of the pairs of switches and the means for controlling the flow of material from the associated storage bin.

Referring now to Fig. 1, the batcher control station is seen to take the preferred form of an upright metal cabinet or housing 20. Located at the top of the cabinet are bell cranks 32 (see Fig. 2) in housings 22 which convert a horizontal pull on rods 31 leading to associated scale beams, to a vertical pull applied to control devices within the cabinet 20. In installations where the scale beams are mounted reasonably close to the cabinet, the long arms of such beams may be attached directly to the pull rods to apply an upward pull thereon and thereby to eliminate the bell cranks 32. On the front panel of the housing are mounted weight indicating dials 24 for the various constituents. By placing all of the dials on one cabinet, as shown, the operator may readily observe each of the dials from the operating position. While only a limited number of dials have been included for purposes of illustration, any desired number can be used. Thus in a large automatic mixing plant dials would be provided for indicating weights of water, cement, sand, fine gravel, medium gravel and cobbles, together with dials for indicating the consistency of the resulting concrete.

Arranged immediately below the dial panel is a recorder 26 for recording, continuously if desired, on a sheet of paper, the readings indicated on the dials. Conveniently arranged below the recorder there may be a work surface 28 used by the operator in writing memoranda and for mounting push buttons, selector switches, recorder switches, signal lamps, and the like.

Placed within reach of the operator is the mix selector 30 for selecting any desired one of a plurality of proportions or "mixes" required for a desired type of concrete. The number of mixes which may be selected may include a dozen or more, depending only upon the complexity of the batcher installation.

In one type of weighing scale, and with which the batcher control to be discussed is most readily adapted, the weight W to be measured (see Fig. 7) is applied to the short arm of a pivoted beam B. The longer arm of the beam, requiring a counterbalancing force which is only a small fraction of the weight to be measured, may be connected by a linkage L to one of the pull rods 31. The latter is arranged to turn a horizontal shaft 44, such turning being resisted by a pendulous counterweight 45. Increased weight applied to the scale beam B causes an increased displacement of the pendulum from its null position to a position where the torque exerted by the pendulum on the shaft 44 is just sufficient to counterbalance the torque exerted by the scale load. The angular displacement of the pendulum shaft 44 therefore becomes a measure of the weight being exerted upon the scale although not proportional to the weight as will be more fully covered hereinafter.

*Weight registration*

The force produced in the weighing scale is transmitted to the batcher control mechanism through the rods or cables 31 preferably led through apertures at the rear of the individual housings 22. Such force is applied in each instance to one of the bell cranks 32 pivoted on a support 33 which is mounted rigidly within a housing 22. The horizontal incoming force applied to the crank 32 results in a vertical force being applied to the pull rod 33 leading down to the pendulum shaft and associated linkages. The housing 22, it will be noted, is fastened to the enclosure 20 by a sleeve fastening device 34 which enables the crank housing to be swung about the axis of the pull rod 33. This enables the horizontal force from the scale to be applied from practically any desired angle. If the scale is located within a reasonably short distance from the control station, it is possible to dispense with the bell crank 32 and to apply the upward force exerted by the long arm of a weighing scale directly to the pull rod 33.

In order to protect the indicators, recorders, and switches against suddenly applied transient loads and to prevent overtravel of the linkages, a dash pot 36 is preferably inserted in the pull rod 33 (Fig. 2). Such dash pot may be of the oil-filled type or any other equivalent type which will allow steadily maintained loads only to be transmitted through to the indicating and recording portion of the device. In the device shown, a supporting rod 38 attached at its upper end to the housing 20 serves to support and steady the dash pot thereby preventing binding of the piston within the dash pot while allowing the upper end of the pull rod 33 to have a slight amount of lateral freedom.

To compensate for moisture in the sand, a compensating bar 40 is inserted in the linkages associated with the scales measuring the quantities of sand and water. In the present embodiment the compensating bar 40 is shown (Fig. 4) connected to adjacent pull rods 33 and 33a mounted near the rear of the housing 20. The function of the compensator bar is to correct, accurately and automatically, for moisture in the sand and will be referred to in greater detail at a later point in the discussion.

In order that the pull from the weighing scale may be applied with a constant mechanical advantage to the remainder of the mechanism, a draft band 42 is connected at the bottom of the pull rod 33 and wound about a drum 43 with its other end anchored to such drum so as to cause rotation thereof as the band reels in or out. Counter-torque to oppose the pull exerted by the draft band, and thus keep the force system in equilibrium, is supplied by a pendulum 45 attached to the drum 43. Rigidly mounted with respect to the drum 43 and rotating therewith is a supporting shaft 44 extending forwardly within the main housing 20. The pendulum 45 may be adjustably spaced from shaft 44 by a pendulum rod 46 which is threaded and provided with a lock nut 48.

The shaft 44 is supported at its forward and rearmost ends by anti-friction bearings 50 and 52 (Fig. 2), the outer races of the bearings being mounted in the lower portion of a frame 53 suitably supported within the cabinet 20. Also mounted in this lower portion of the frame 53 is a bumper arm 54 (Fig. 3) which serves to resiliently engage the pendulum 45 upon sudden removal of the weight from the associated scale. The pendulum 45 is initially displaced from the freely suspended position so that, with no weight on the associated scale, torque is applied by the pendulum to take up any play existing either in the linkages associated with the crank 32 or in the weighing scale itself. The total static pull at zero loading is preferably of the order of ten pounds.

Figures 3, 5:
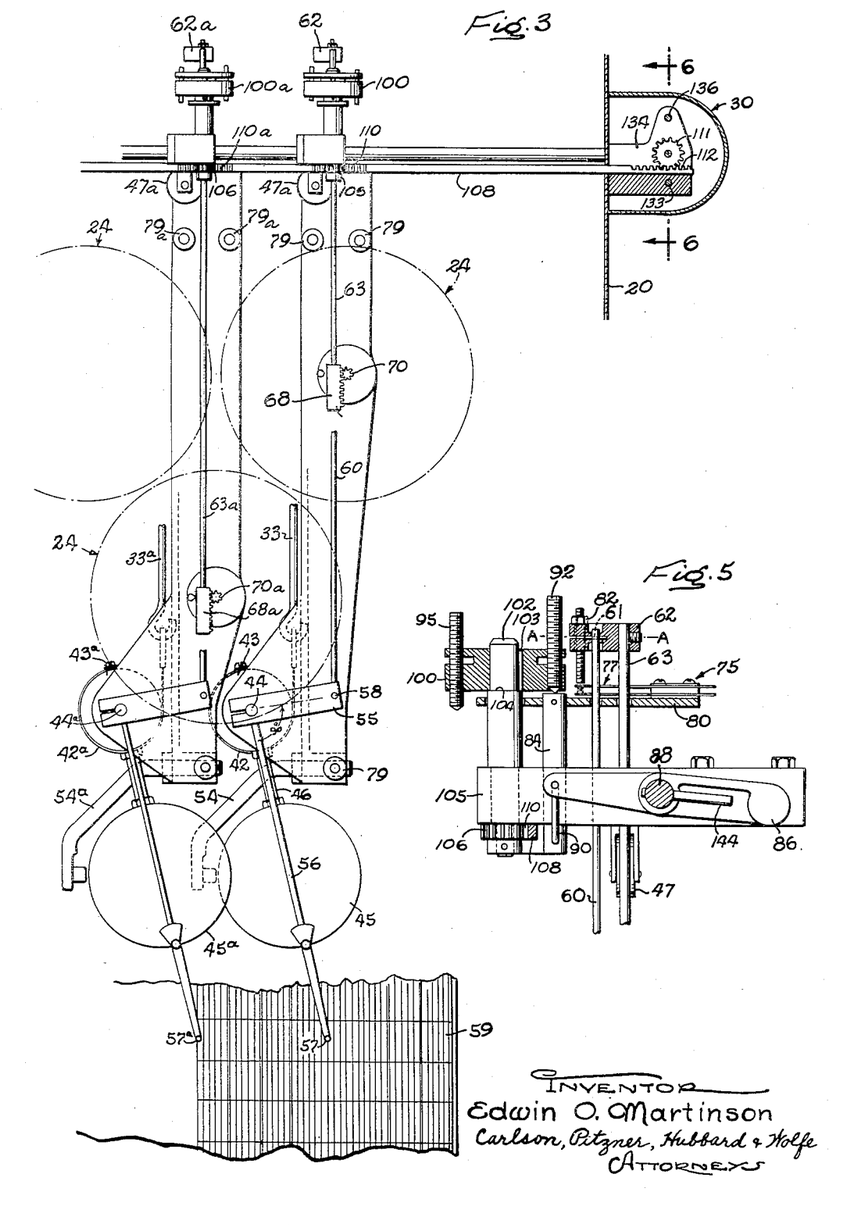
Fig. 3 is a front view of the control mechanism showing two adjacent control assemblies and the associated indicating and recording devices.
Fig. 5 is a detail view, partially in vertical section, of the control switch and associated positioning assembly.

Mounted near the forward end of the shaft 44 and rigidly connected therewith is a crank 55 and a pen arm 56 (Figs. 2 and 3). The latter, by means of a pen 57, imparts an arcuate trace on a traveling web of recorder paper 59. Any suitable drive (not shown) may be provided for advancing the web of paper at a suitable rate. Both the pen arm and crank are deflected angularly in accordance with the force exerted by the incoming linkage.

Pivotally connected to the outer end of the crank 55 is a push rod 60 moving upwardly as the force on the associated scale is increased and downwardly as such force is decreased. The push rod 60 terminates in a horizontally pivotal connection 61 with a push rod block 62 (Fig. 5). The latter block serves as a rigid mounting for a depending indicator or dial rod 63 which carries at its lower end a rack 68 for operating a dial pointer 67.

Thus it will be seen that with the parts arranged as shown the upwardly extending rod 60, the block 62, and the downwardly extending rod 63 move as a unit, serving to rotate the pinion 70 in response to the force applied to the mechanism by the associated scale beam. To minimize friction and to guidingly support the rod 60 a roller 47 is employed which is mounted generally under the block 62 and bears against the rod 63 (Fig. 5). The rod 63 is kept in light contact with the roller and the rack 70 is kept in full engagement with the pinion 70 by locating the center of gravity of the block 62 somewhat to the right of the point of attachment with the rods 60, 62. As viewed in Fig. 4, such overbalancing tends to cause rotation of the block 62 about an axis A. In analyzing the effect of the latter it will be seen that the torque produced by the shift of the center of gravity is resisted not only by the roller 47 but also by the rack 68 pressing against the pinion 70. Since the contact pressure is, however, extremely light there is substantially no resistance to vertical movement of the linkage.

If desired, and as is apparent to one skilled in the art, a retaining pin, roller or other type of stop may be employed adjacent the rack 68 to prevent it from becoming disengaged from the pinion 70 when the entire assembly is bumped or jarred.

The size of the pinion 70 is preferably such that the shaft 72 will make approximately one revolution as the weight on the associated weighing scale is increased from zero to its maximum rated value. Indicia for the pointer 67 are applied to the surface of the recessed dial panel 69 the latter being rigidly connected to the frame 53 by the supporting posts 79.

One of the inherent and novel advantages of the arrangement just discussed is that the movement of the rack 68 and the associated pointer 67 is proportional to the pull on the pull rod 33 (exerted by the scale beam) all without the use of specially formed cams, auxiliary pendulums or similar complications. From inspection of Fig. 3 it will be apparent that the deflection $\theta$ of the pendulum 45 as a result of a pull P on the draft band is given by the following expression:

$$P = k \sin \theta \tag{1}$$

where $k$ is a proportionality constant depending upon the size of the pendulum. It will also be seen that the deflection D of the rack 68 and the associated pointer 67 may be given by the following expression, provided that the rod 60 is perpendicular to the crank when the latter is in its initial position and also provided that the rod is several times longer than the crank:

$$D = k' \sin \theta \tag{2}$$

where $k'$ is a proportionality constant depending upon the length of the crank.

Combining (1) and (2) to obtain the deflection D in terms of the pull P it is found that:

$$D = k'/k \; P \tag{3}$$

This expression shows that the indicated deflection is directly proportional to the pull exerted by the scale beam. It may readily be verified that with a rod approximately six times as long as the crank (Fig. 3) and operating through a range of approximately forty-five degrees of pendulum swing, the error in proportionality caused by the side swing of the rod 60 is much less than one-tenth of one percent, the required tolerance for commercial scales.

Cut-off switches

A pair of switch operating pins or rods 64, 65 (Fig. 4) are slidably received in corresponding holes in the block 62. Positioned at the lower ends of these rods 64 and 65, and arranged normally to be subject to the weight thereof, are sensitive contact-bearing arms 76 and 77 of switches 74 and 75 respectively. The weight of the rods 64 and 65 is sufficient normally to press the contact arms 76, 77 down into closed position. The switches 74 and 75 are supported at a predetermined elevation with respect to the push rod block 62 by a switch mount or supporting block 80. The latter is maintained at a selected elevation by means which will be discussed in a following section.

As the push rod block 62 is driven upwardly by the push rod 60, a point of elevation is reached at which a nut 82 on the switch-controlling rod 65 is engaged by the block 62 resulting in the picking up of the rod 65 and the opening of the switch 75. Further upward movement of the block 62 causes engagement of a nut 81 on rod 64, removing the weight from the spring arm 76 and causing opening of the switch 74. Switches 74 and 75 are utilized to control the cut-off of the flow of material from the hopper or bin to the weighing scale. Such control is readily understood by one skilled in the art and therefore has been shown merely schematically in Fig. 8. Suffice it to say that the opening of switch 74 (caused by an increase of the weight of material on the associated scale) serves to cut off the flow of material from a storage bin S to the weigh hopper of the scale when a predetermined weight of such material has been deposited on the scale. Preferably an auxiliary device is used for slowing down the flow of material prior to its complete cut-off. Such an auxiliary device may be connected to the auxiliary switch 75 to operate upon the opening thereof. This enables the major portion of the discharge to occur at high speed, the discharge being slowed to a lesser speed to enable a more accurate final cut-off. The point at which such slowing down occurs depends on the relative effective lengths of the rods 64 and 65, obtained by proper positioning of adjusting nuts 81 and 82.

The switch structure including the one-way force transmitting connection which has been described has the advantage that the depositing of material on the scale for any reason whatsoever in a greater amount than that for which the switch has been adjusted merely causes overtravel of the switch control rods 64 and 65. The actual amount of material deposited on the scale under such conditions is accurately indicated on the indicator dials and on the recording paper.

The mechanism consisting of the crank 55, the push rod 60, the block 62 and the depending dial rod 63 all arranged in the manner disclosed in the drawings is a departure from the cam and roller construction frequently heretofore employed in scales to obtain linear deflection of an indicating dial with an increase in weight. It has been found that the simple pivotal connection between the crank 55 and the push rod 60 is inexpensive, trouble free and substantially frictionless.

The device as described thus far is effective to cut off the flow of material to the scale when a predetermined amount has been deposited thereon, to indicate continuously on a dial indicator the exact weight of the material deposited on the scale, and further to record such weight in terms of a trace on a strip of moving recorder paper. The operation may be summarized as follows: An increased weight upon the scale causes an increased tensile force to exist in the pull rod 33 which in turn causes a counterclockwise movement of the pendulum 45. The resultant counterclockwise rotation of the shaft 44 results in upward movement of the push rod 60, raising the push rod block 62 as the predetermined weight of material is approached. Upward movement of the push rod block results in the engaging of the block with nut 82 and the raising of the contact rod 65. The circuit of switch 75 is thereupon opened and the flow of material onto the scale consequently is reduced by any suitable auxiliary device located at the point of discharge of material. The ensuing gradual increase in the weight of material on the scale causes further gradual upward movement of the push rod block until nut 81 of contact rod 64 is engaged and the circuit of switch 74 broken to completely stop the flow of material to the scale.

*Mix selector*

The "mix selector" 30 next to be discussed serves to position the switch supporting block 80 (Figs. 4 and 5) vertically with respect to the push rod block 62 at a series of selectable predetermined elevations. The elevation selected determines the weight on the scale at which the switches 74 and 75 will be operated and the flow of material automatically cut off. In the instant embodiment the block 80 is pinned to an upwardly extending switch supporting rod 84 (see Fig. 5). A counterweighted arm 86, freely pivoted on a transverse shaft 88 and connected to the supporting rod 84 by means of a link 90, forces the rod 84 upwardly into contact with a stop. The stop for thus limiting upward movement of the switch support may be any selected one of an annularly disposed series of screws 92—97 mounted about the periphery of a selector block or turret 100 (see also Fig. 4). The latter is rotatably mounted on a vertical shaft 102 to move a selected one of the setscrews into a position above the switch supporting rod 84, which position, for purposes of convenience, may be termed the "positioning station." Full view of the turrets 100 and sets of switches 74, 75 is afforded through a glass panel or observation port 20a in the upper portion of the cabinet (Figs. 1 and 2).

The turret 100 is fixed to the shaft 102 by a key 103 (Fig. 5), sufficient clearance being allowed, however, to enable the selector block to be readily removed by hand from the end of shaft 102. Downward movement of the turret 100 along the shaft 102 is prevented by the shoulder 104, such shoulder serving to vertically position the selector block itself always at the same elevation with respect to the remainder of the mechanism.

Mounted at the upper end of the frame 53 is a rigidly extending arm 105 serving to rotatably support shaft 102 (Fig. 5 and see also Fig. 2). Rotation of shaft 102 is accomplished by means of a pinion 106 attached at its lower extremity. In order to bring a selected one of the setscrews 92—97 into the positioning station, a transversely slidable rod 108 (Figs. 3 and 4) having a rack 110 engaging the pinion 106 is moved linearly rotating the pinion 106 and the shaft 102. Such motion is imparted to the rod 108 by means of a pinion 111 and rack 112, the pinion 111 being manually controlled by a control knob 113.

It is particularly to be noted that the rack 110 meshes in proper registration with similar pinions 106 associated with the whole series of adjacent control units so that all of the turrets 100 are positioned simultaneously by turning of the knob 113. Consequently, for a given setting of the control knob, one of the setscrews 92—97 in each of the turrets 100 is in the positioning station. Subsequent movement of the control knob to an adjacent position causes movement into the positioning station of the adjacent setscrew in each of the turrets. It will be obvious that for each setting of the control knob, and consequently of the rack 110, a predetermined quantity of water, sand, cement and aggregates may be automatically weighed. Movement of the rack 110 to bring a different setscrew into each of the positioning stations causes ingredients to be weighed out in quantities determined by the respective settings of the setscrews thereby to form a completely different concrete mix.

Prior to rotation of each turret 100 to bring a different setscrew into the positioning station, it is necessary that the associated switch positioning rod 84 be temporarily lowered. If this were not done the upward bias of the switch supporting block 80 would cause the end of the supporting rod 84 to lodge between adjacent setscrews preventing rotation of the turret. As here shown, the mix selector control knob 113, used to select the desired mix, is also used to produce temporary lowering of the switch support 80.

Figure 6:
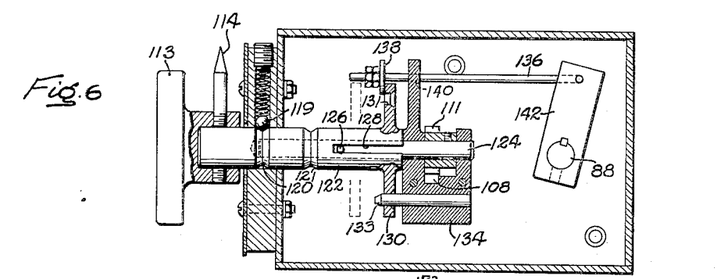
Fig. 6 is a sectional view of the mix selector control taken on line 6—6 of Fig. 3.

The mechanism which is preferably used in association with the mix selector control knob 113 is shown in detail in Fig. 6. In this embodiment the control knob is fixed to a sleeve 122 slidably telescoped on a shaft 124. A laterally projecting pin 126 on the shaft is entered in a longitudinal slot 128 in the sleeve, thus permitting relative axial movement of the shaft and sleeve while coupling them for rotation in unison. The shaft 124, which is journaled in a supporting bracket 134, serves to rotate the pinion 111 to produce longitudinal movement of the rack bar 108 already referred to.

Rigidly fastened to the rearmost portion of the sleeve 122 is an indexing disk 130 having therein an annularly disposed series of equidistantly spaced indexing holes 131. Selectively engaging the indexing holes 131 is a pin 133 rigidly mounted in the supporting bracket 134. Thus before rotation of the shaft 124 may occur, it is necessary to pull the control knob 113 forward to free the disk 130 from the indexing pin 133. The limits of axial movement of the control knob 113 are determined by a spring pressed detent 119 engageable either with a groove 120 or groove 121 on the sleeve 122.

Engaging the outer edge of the indexing disk 130 is a pull rod 136 (Fig. 6) carrying at its end an interfering shoulder 138 which may, for example, consist of a washer and positioning nut. The pull rod 136 is maintained in engagement with the edge of the indexing disk by reason of its passage through an aperture 140 in the supporting bracket 134. A crank 142 pivoted to the pull rod 136 and keyed to the transverse shaft 88 subjects such shaft to counterclockwise rotation as the control knob 113 is withdrawn to its outer position. Upon counterclockwise rotation of the shaft 88, a pin 144 mounted therein (Fig. 4) engages the counterweighted arm 86 subjecting it to counterclockwise rotation. As the counterweighted arm 86 rotates, it produces a downward movement of the link 90 which lowers the switch supporting rod 84. The extent of such lowering should preferably be sufficient to clear the longest setscrew which may conceivably be used in the turret 100.

Since the shaft 88 extends through and into engagement with each of the control assemblies, the counterweighted arms associated with each of such units are rotated and the associated switches simultaneously lowered in the same manner as described immediately above. It will appear obvious to one skilled in the art that the number of indexing holes 131 in the indexing disk 130 will normally correspond to the number of setscrews provided in each of the selector blocks and will equal the number of mixes available.

In changing from one mix to another it is necessary merely to grasp the knob 113 of the mix selector 39, pull forward until it is free to turn, then turn the knob to a new mix, and shove the knob back into its retracted position. A pointer 114 coacts with indicia on the housing for the selector (Fig. 1) to indicate the mix selected.

*Turret calibration.*

In order that a given position of the turret 100 may correspond to a predetermined accurate weight of material deposited on the associated weighing scale, it is necessary that the setscrews 92—97 be accurately adjusted. Such adjustment is preferably accomplished by first displacing the dial pointer and associated linkage an amount corresponding to a predetermined weight of material on the scale and next adjusting the selected setscrew to a point just sufficient to break contact in the main cut-off switch 74.

The displacement of the linkage may be accomplished by any desired means, for example by loading a predetermined weight of material on the scale. I prefer however to displace the linkage artificially to produce a predetermined scale reading. In the present embodiment this is done by moving the respective pull rods upwardly by means of an adjustable bell crank arrangement disclosed in Figs. 2 and 4. The bell crank indicated generally at 170 is pivotally mounted by a pin 171 on a cross bar 172 which extends the width of the cabinet. As shown, the bell crank is formed of two plates 173 in spaced relation rigidly engaging a lifting finger 174 projecting under a collar 175 on an associated pull rod.

Extending between the plates 173 at a point above the pivot is a dowel 176 rotatable with respect to the plates and having a transverse tapped hole. The latter receives the threaded end of a rotatable rod 177 which extends through the front of the cabinet terminating in an adjusting knob 178. In the top of the cabinet and located above the respective positioning stations are apertures 180 which admit a suitable setscrew adjusting tool. The latter apertures are covered when not in use by a cover or plug (not shown) to prevent the entry of dust or other foreign material.

To adjust the batcher to produce a given mix it is merely necessary to turn one of the knobs 178 causing the lifting finger 174 to urge the associated pull rod upwardly and deflecting the dial pointer to give the desired reading. The adjusting tool is then inserted into the corresponding aperture and the setscrew in the positioning station rotated to a point just sufficient to break contact in the cut-off switch 74. The knob 178 is then turned to lower the finger 174 completely out of engagement with the collar 175. The foregoing procedure is repeated for the "first" setscrew in each of the turrets 100. The weight of sand, cement, water and the like for a "first" mix is, of course, known and the setscrew controlling the amount of each of these ingredients is adjusted to operate the associated electrical switch at the proper weight. The selector knob is next moved to its "second" position bringing to the active position a new set of setscrews. These are adjusted to operate their respective switches at weights corresponding to the quantity of each ingredient required to produce the "second" mix. This process is repeated for the "third" and succeeding mixes.

Because of the slidable keyed engagement between the turret 100 and the shaft 102 on which it is mounted (Fig. 5), the turret may be readily removed by hand. This is not only helpful for cleaning and inspection purposes but also to enable the calibration of duplicate turrets external to the mechanism merely by adjusting the setscrews to correspond respectively to those in a master turret which has been calibrated in the manner outlined. Such removal also has the advantage that a number of differently calibrated turrets may be interchangeably used with each control assembly thereby providing a much wider choice in the number of mixes available.

*Moisture compensating lever*

In the batching of concrete the sand normally contains appreciable and varying percentages of moisture. Since the batched proportions are computed on the basis of dry weight of sand and gravel and the amount of water is likewise based on the use dry material, considerable variation in the batched proportions, and especially in the slump of the concrete, is caused by variations of moisture in the sand and to a lesser degree by a variation of moisture in the fine gravel. It is, therefore, desirable to incorporate a means of compensating the weight of sand so that the batcher will weigh up an additional amount of wet sand to compensate for the water contained therein. It is further desirable to reduce the amount of water weighed up in the water batcher by the amount of water actually contained in the fine aggregates.

Means for accomplishing such compensation are described and claimed in my copending application Serial No. 655,345 filed March 18, 1946. The compensating mechanism described in the latter application has particular and novel utility as a component part of the batcher control mechanism described herein, being a large contributing factor to the speed, accuracy and ease of operation which may be realized.

Since the moisture contained in the sand is of primary importance, many times exceeding that contained in the gravel, the use of the compensating lever will be restricted in the discussion which follows to application to the sand and water linkages. It will be understood, however, that an additional compensating lever may, if desired, be used between the linkages associated with the weighing scales for the fine gravel and water in exactly the same manner as described in connection with the weighing of sand and water.

Figures 4, 7:
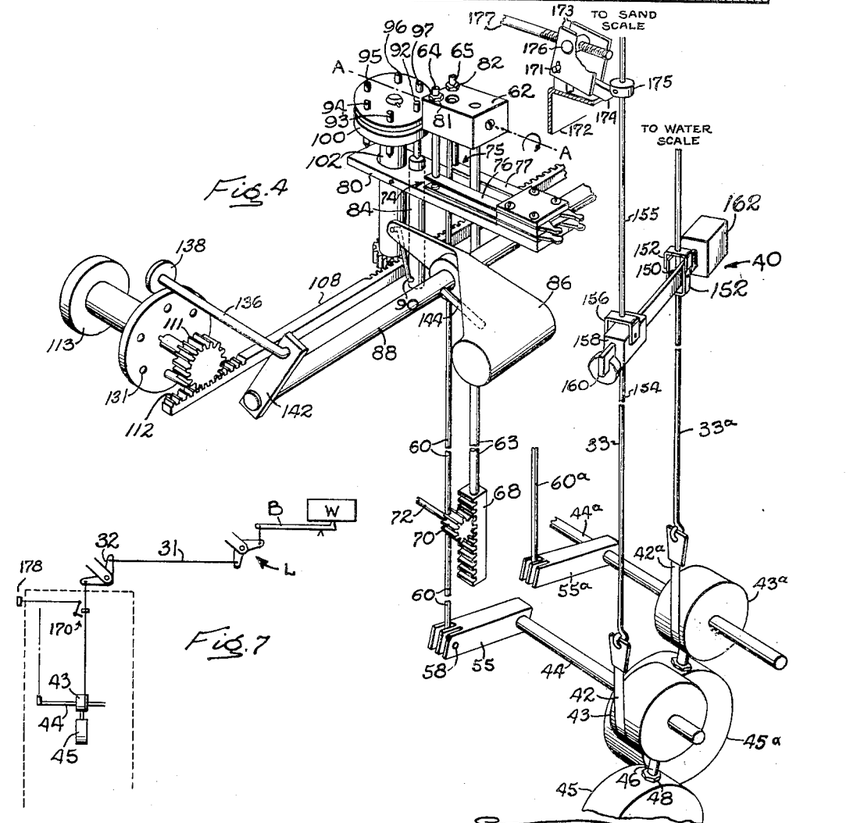
Fig. 4 is a perspective view showing one of the individual control assemblies together with means for selecting the quantity of material to be weighed.
Fig. 7 is a schematic view of the operating connections from the batcher scale beam to the control mechanism.

As shown in Fig. 4, the compensating lever 40 bridges the pull rods 33 and 33a associated with the scales measuring the sand and water respectively. The pull rod 33a is pivotally fastened to a fixed point 150 on the compensating lever 40 by means of the shackles 152. Near the other end of the compensating lever the lower portion 154 of the pull rod 33 is likewise pivotally fastened to the compensating lever at a fixed point. While actual point of fastening of the portion 154 of the rod is not visible, coupling is accomplished in the same manner as that illustrated at point 150.

The upper portion 155 of the pull rod 33 is fastened by means of a shackle 156 to a slide 158. The position of this slide along the lever 40 is adjustable by means of the slide adjustment knob 160. At the outermost position of the slide 158 the portions 154 and 155 of the pull rod 33 are in exact alinement and the lever so adjusted has no compensating action. At the inner extreme position, corresponding to maximum compensation, the slide 158 may be 10 to 20% of the distance toward the point of attachment 150 of the pull rod 33a. Normally an intermediate adjustment is used. A counterweight 162 is provided on the opposite side of the pivotal point of attachment 150 which acts about this point to produce an upward force in the portion 154 of the rod 33 and initial deflection of the pendulum 45.

In use it is merely necessary to determine the percentage of moisture in the sand by any one of a number of ways known to those skilled in the art. The slide 158 is then advanced toward the pull rod 33a an amount proportioned to the percentage of water in the sand. Such adjustment is facilitated by graduating the adjusting knob 160 directly in terms of the percentage of moisture for which it is desired to compensate. Suppose, for example, that the sand contained 10% moisture. The operator would merely adjust the slide 158 until the graduations associated therewith indicated that the slide (and therefore the portion 155 of the pull rod 33) is one-tenth the distance to the pull rod 33a. Under such conditions a quantity of moist sand on the scale which actually weighs 1000 pounds would be indicated as only 900 pounds on the sand indicator dial and 100 pounds on the water indicator dial and the switch operating linkage would be correspondingly positioned. Thus if a given mix required 1000 pounds of dry sand, the sand cut-off switch would not operate until a sufficient weight of moist sand had been deposited on the sand scale to correspond to 1000 pounds of dry sand. The rate of water discharge may be adjusted so that the weighing of the sand is completed first. Consequently the water cut-off switch would operate to limit the water deposited on the water scale to the required weight minus the weight of the water in the sand. The total water on both scales is properly indicated since water in the sand contributes to the deflection of the linkage associated with the water indicating and control mechanism. The setting of the slide 158 may be changed from time to time to correspond with periodic observations of the percentage of moisture in the sand.

*Correlation of unit assemblies*

Extreme compactness of a central control station constructed in accordance with my teachings results from the fact that the individual control assemblies may be made very narrow, each occupying only a small portion of the width of the cabinet. It will be noted, particularly from Fig. 3, that the lower shaft 44 and the corresponding shafts in adjacent units are very closely spaced. In order to avoid interference between the pendulum 45 and the pendulums on the adjacent shafts, the alternate pendulums are displaced forwardly. In the embodiment illustrated, such displacement requires alternate pull rods 33 to be displaced forwardly by the same amount. If desired, however, the pendulums may be suspended from the shafts 44 independently of the draft band drums 43. In this way alternate pendulums may be forwardly displaced while allowing the draft bands and draft band drums to be maintained in parallel relation and lying within the same vertical plane.

The proximity of the pull rods, for example adjacent pull rods 33 and 33a, particularly suits the construction for use with compensating levers. If desired such levers may occupy the back portion of the cabinet as shown. It should be noted, however, that it is not necessary in the practice of the invention to mount the compensating levers within the cabinet. As a matter of fact, such compensating levers may be mounted in the system at any desired point between the scale itself and the draft bands. Further, if desired, the compensating levers may be mounted to be subject to horizontal rather than vertical forces, although, if so mounted, the weight of the lever and slide would not contribute to the static pull at zero scale loading as it does in the structure illustrated.

Because of the close spacing of the dial rods 63 in adjacent units, it is desirable to vertically offset the centers of alternate indicating dials so that they fall in two superposed rows. This can be readily accomplished as shown simply by shortening the dial rods 63 of alternate control units, thereby raising the dial operating racks 68 and the pointer shafts 72 associated with such alternate units. As clearly indicated in Fig. 3 this enables the indicating dials to be of approximately double the diameter which would normally be allowed by the close spacing of the shafts and cranks which control them.

Various advantages in the structure described above will appear immediately to those skilled in the art. The use of a plurality of control assemblies having similar components has the advantage that a single one of such assemblies may be removed for replacement or bench repair without markedly affecting the remainder of the assembly. Since the mechanism is both simple and straightforward and readily understood by an unskilled attendant or operator, minor repairs and adjustments may be made on the job. The unitary construction enables the control station to be transported from point to point with maximum facility, and a minimum expenditure of time is required for installation at a new location.

Résumé of operation

After the batcher control mechanism has been installed at a batching location and properly connected to the associated weighing scales by rods or cables 31 or equivalent coupling linkage, the knob 113 is set to indicate a mix having the desired proportions of ingredients. Prior to setting the knob it is necessary to manually withdraw it, such withdrawal causing counterclockwise rotation of the transverse shaft 88, tilting of the counterweighted arm 86 and consequent lowering of the switch support 80. Subsequent rotation of the knob 113 causes a translation of the rod 108 and simultaneous rotation of the turrets 100 to bring into the respective positioning station a selected one of the setscrews in each of the turrets. Next inward force is applied to the knob producing clockwise rotation of the shaft 88 and a raising of the switch support 89 in each of the control assemblies into contact with the previously selected setscrew.

Upon contact of the cut-off switches 74 and 75 in each of the assemblies caused by raising the switches, ingredients will be deposited on the respective scales, increasing the force in the connecting linkages 31 and causing an increasing displacement of the associated pendulums 45. Rotation of the pendulum shaft 44 brought about thereby causes rotation of the crank 55 and upward movement of the push rod 60. When the upward movement of the push rod reaches a predetermined amount, the push rod block 62 lifts the switch control rod 65 breaking contact in switch 75. The breaking of the contact 75 is utilized to produce a reduction in the rate of discharge of material onto the associated scale. As the push rod block 62 is additionally raised to a predetermined point, it engages the switch control rod 64, breaking the contact within switch 74 resulting in the complete cutting off of the flow of material being fed to the associated scale.

When the operator notes that the automatic weighing of each ingredient has been completed he may empty the scales by any desired means and cause the formation of a succeeding batch of material by repeating the above procedure. If it is desired to change the proportion of the mix, it is merely necessary to withdraw the knob 113, turn the knob to a position corresponding to the desired mix and push the knob inwardly at its new position. During such automatic weighing operations the recorder paper may be advanced either at a constant rate or intermittently to obtain a desired spacing between the readings. From time to time during the working day it is desirable to adjust the slide on the sand-moisture compensating lever 49 to correspond with the periodically ascertained percentage of moisture in the sand.

Control of multiple material batcher

In the foregoing discussion it has been assumed that a given scale and its associated control assembly including a linkage, switch, indicator dial and recorder is used for the weighing of but one material, hence the use of the terms "sand dial," "water dial," and the like. It has been found, however, that the above described apparatus is also well suited for use with a so-called "multiple material batcher" in which a given scale is used to weigh out more than one material.

In order to more fully appreciate the latter use of the device, let it be assumed that only one scale and control assembly is used for the accumulative weighing of all of the materials making up a batch of concrete. The first setscrew under such conditions is adjusted to automatically weigh out a predetermined amount of a first material, for example sand. The turret 100 is then rotated to bring a second setscrew into operative relation with the cut-off switches 74, 75. The second setscrew is adjusted to cause operation of the switches when the weight on the scale equals the weight of the first material plus a predetermined weight of a second material, for example gravel. The second material is added until cut-off occurs. Next a third setscrew, adjusted to a successively higher weight, is advanced into operating position and a third material weighed. In the same manner additional materials constituting a batch are accumulatively weighed until the batch is complete whereupon it may be discharged and the process repeated.

I claim as my invention:

1. In a control mechanism for a batcher having a scale beam and a material cut-off device, the combination of a switch for controlling said cut-off device, an actuating plunger movable axially for operating said switch, means for connecting said plunger to the scale beam for actuation thereby, means supporting said switch for bodily adjusting movement relative to said plunger in a direction paralleling the latter's path of travel, a turret having a plurality of stops thereon adapted to limit adjusting movement of said switch supporting means, and manual means for rotating said turret to bring a selected one of said stops into operative association with said switch supporting means.

2. In a control mechanism for a batcher having scale beams for the weighing of sand, water and cement, moisture compensating means comprising: a plurality of parallel shafts each having a pendulum weight and a drum fixedly mounted thereon, draft bands wound about said drums and each having one end anchored thereto, incoming parallel rods respectively transmitting force from the water and sand beams and normally positioned in substantial alinement with unwrapped portions of said draft bands, a compensator lever associated with said rods and substantially perpendicular thereto, means connecting said compensator lever with said draft bands, and means on said compensator lever for adjustably moving at least one of said rods along said lever out of alinement with the associated draft band in accordance with an ascertained moisture content of said sand.

3. In a control mechanism for a batcher having a plurality of weighing scales and means to cut off the flow of material thereto, the combination comprising: linkages connected to said scales and respectively displaced in accordance with the weight of material thereon, a cut-off control device associated with each of said linkages and operated upon the reaching of a predetermined displacement thereof, positioning means associated with each of said devices for respectively positioning said devices at a series of selectable locations relative to the associated linkage, and manually operated means for simultaneously controlling the location of each of said positioning means.

4. In a control mechanism for a batcher including a plurality of weighing scales and cut-off means for stopping the flow of material to said scales respectively, the combination comprising: a frame, a plurality of shafts mounted in said frame, linkages respectively associating said weighing scales and said shafts to produce rotational displacement of said shafts, push rods subject to substantially axial movement upon the oscillation of respective ones of said shafts, a switch operator associated with each of said push rods, a switch arranged to be operated by each of said switch operators, means for positioning each of said switches at predetermined locations with respect to said switch operators, said switch positioning means including rotatable turrets having selectable stops, and a manually operated rack for simultaneously rotating said turrets to bring a selected combination of stops into operative relation with the associated switches respectively.

5. A device for use with a batcher for bulk materials having a plurality of weighing scales and means to control the flow of material thereto, the combination comprising: linkages for connection with said scales respectively, pendulous counterweights respectively displaced by said linkages whereby a given weight of material on one of said scales causes a predetermined deflection of the associated counterweight and linkage, electric switches adjustably positioned relative to respective ones of said linkages and operating upon the reaching of a predetermined deflection of the associated linkage to operate said flow control means, a set of positioning stops associated with each of said switches selectively insertable into operative relation with respect thereto for determining the point of deflection of said linkage required to cause operation of the corresponding switch, and manual selector means for simultaneously inserting a predetermined one of said stops from each of said sets to produce deposition of materials on said scales in a selected quantity and proportion.

6. In a control mechanism for a batcher having a scale beam, the combination of a switch, a movable actuating member for said switch, means for connecting said member to the scale beam for displacement thereby, means for effecting relative bodily displacement between said switch and said actuating member to adjust the point in the travel of said member at which said switch is operated, and means including a manually revoluble turret having a plurality of stops thereon for fixing the relative positions of said switch and said actuating member.

7. In a control mechanism for a batcher having a scale beam and a material cut-off device, the combintion comprising: a switch for controlling said cut-off device, said switch being maintained in closed condition by application of downward force thereon, a vertical push rod, means associated with said scale beam displacing said push rod axially in accordance with the weight on said scale, a switch actuator normally applying downward force to said switch, interfering means on said push rod to raise said switch actuator out of contact with said switch upon said rod exceeding a predetermined displacement, and means for vertically positioning said switch in a series of selectable positions with respect to said push rod.

8. A central control station for use with a batching device having a plurality of scales and cut-off means for stopping the flow of material to said scales, comprising in combination: a plurality of linkages, means connectible between respective ones of said scales and corresponding ones of said linkages for deflecting the latter in accordance with the amount of material on the associated scale, a pair of contacts associated with each of said linkages and effective to control the respective cut-off means, a set of stops associated with each of said pairs of contacts, each stop being effective to position the associated pair of contacts in predetermined relation to said linkage means thereby to determine the point of deflection of said linkage required for operation of the associated contacts, rotatable turrets associated with respective ones of said pair of contacts and each mounting a set of said stops for bringing a selected stop into engagement with the corresponding pair of contacts, and a common control knob for simultaneously rotating said turrets to effect operation of said pairs of contacts upon the attaining of the desired weight of material on each of said scales.

9. In a control mechanism for use with a batcher having a plurality of scale beams, the combination comprising: a frame, a plurality of shafts mounted in said frame in parallel closely spaced relation, linkages connecting said shafts with respective ones of said scale beams, a pendulous weight on each of said shafts whereby the rotational position of a given shaft is dependent upon the amount of weight on the associated scale, cranks on said shafts respectively making substantially a right angle with respect to the center of gravity of the associated weight, push rods pivotally connected to said cranks respectively, blocks pivoted to the upper ends of said push rods respectively mounted for movement in vertical paths, and dial indicators for deflecting in proportion to the movement of said blocks respectively, said push rods being several times as long as the associated crank whereby any nonlinearity of dial deflections upon given increments of force applied by said scale beams is substantially eliminated.

10. A central registering device for use with a plurality of weighing scales and means to individually control the flow of material thereto comprising: a frame, shafts mounted in said frame and arranged to be angularly deflected in accordance with the weight on the associated one of said scales, said shafts being oriented in coplanar, closely spaced, parallel relation, push rods associated with said shafts and translatable thereby, said push rods extending upwardly from said shafts in substantially parallel relation, a push rod block mounted at the upper end of each of said push rods respectively, dial rods extending downwardly from said push rod blocks respectively, dial indicators operated by said dial rods respectively, adjacent dial rods being of unequal length so that alternate ones of said dials may be mounted above the remaining ones of said dials in nested relation.

11. A central indicating device for a batcher having a plurality of remotely located measuring devices comprising: a frame, a plurality of parallel shafts associated with said measuring devices and arranged to be deflected in proportion to the weights of material acting on said devices, dial indicators for said shafts respectively and having their pointers coupled for displacement therewith, recording arms fixed to said shafts for respective rotation therewith, and recording styli on each of said arms respectively, said styli being arranged in a plane to enable contact with a single sheet of recording paper.

12. A central registering device for a batcher having a plurality of remotely located weighing scales comprising: a frame, a plurality of parallel shafts in closely spaced substantially coplanar relation arranged to be deflected in accordance with the weight on the associated scale, rods mounted for reciprocating movement and actuated by said shafts respectively, said rods extending upwardly therefrom in closely spaced parallel relation, dial indicators associated with said rods respectively, recording arms rotatably positioned by said shafts respectively and extending downwardly therefrom and recording styli on each of said arms, said styli being so arranged as to impart a trace upon a single sheet of recording paper.

13. A control station for use with a plurality of weighing scales and means to cut off the flow of material thereto comprising: linkages connected to said scales and respectively deflected in accordance with the weights of material thereon, electrical switches associated with each of said linkages and operated upon the reaching of a predetermined deflection thereof, means for respectively positioning each of said switches at a series of selectable locations with respect to the associated linkage, said positioning means including a turret and a plurality of differently adjusted stops mounted therein, and means for angularly positioning said turret with respect to said linkage, said turret removably engaging said angularly positioning means to enable ready removal for the adjustment of said stops.

14. In a control mechanism for a batcher having a scale beam and a cut-off for cutting off the flow of material thereto, the combination comprising: a switch for controlling said cut-off, a movable actuating member for said switch, means for connecting said actuating member to the scale beam for actuation thereby, means supporting said switch for bodily adjusting movement relative to said actuating member, a turret having a plurality of stops thereon adapted to limit the adjusting movement of said switch supporting means, a control knob rotatively coupled to said turret for selecting a desired one of said stops, and means connected to said switch support and operated by an in-and-out movement of said knob to position said switch support away from said stops during rotation of said turret.

15. In a control mechanism for a batcher having a scale and a cut-off for cutting off the flow of material thereto, the combination comprising: a switch for controlling said cut-off, a movable actuating member for said switch, means for connecting said member to the scale beam for actuation thereby, means supporting said switch for bodily adjusting movement relative to said actuating member, a block having a plurality of stops thereon adapted to engage the switch supporting means to maintain said switch in an adjusted position, a control knob rotatively coupled to said block for selecting a desired one of said stops, biasing means for biasing said switch supporting means into contact with said stops, and means for moving said switch supporting means temporarily out of contact with said stops during movement of said block.

16. In a control mechanism for use with a batcher having a remotely located weighing scale the combination comprising: a control housing, a bell crank on said housing, a horizontal pull rod attached to said crank and associated with said scale, a vertical pull rod in said housing pivotally engaging said crank and moved vertically thereby, a mount for said crank rotatable with respect to said control assembly about a vertical axis of rotation including said vertical pull rod enabling operative association of said scale and said crank regardless of the direction of approach of said horizontal pull rod.

17. In a control mechanism for a batcher having a scale beam, the combination of a pendulum shaft, means actuated by pull from said scale beam for applying torque to said shaft at a constant radius, a pendulum on said pendulum shaft for increasingly applying a countertorque upon deflection of said pendulum from its angular position of rest, a crank on said shaft for rotation in unison with said pendulum, a push rod having one end pivotally supported by said crank and extending generally perpendicularly from the latter when the latter is in the position corresponding to zero torque, a push rod block pivoted to the remote end of said push rod, means for guiding said push rod for reciprocating movement of the push rod block, an indicator rod rigidly connected to the push rod block, and an indicator drivingly connected to said indicator rod for indicating an amount which is proportional to the reciprocating movement of the indicator rod.

18. In a control mechanism for a batcher having a scale beam, the combination of a rotatably mounted pendulum shaft, means actuated by said scale beam for applying a torque to the latter which is proportional to the weight on said scale beam, a pendulum on said pendulum shaft for applying a progressively increased countertorque as the pendulum is rotated from a position of rest by said scale beam, a crank on said shaft for rotation in unison with said pendulum, a push rod pivoted at one end to said crank and extending generally perpendicularly from the latter, a push rod block having a pivotal connection with the other end of said push rod and mounted for reciprocating movement in a direction perpendicular to said crank when the latter is in its initial position, indicator means for registering displacement of said push rod block, said push rod being on the order of six times as long as the crank so that the displacement of said block is substantially proportional to the weight on said scale beam.

19. In a control mechanism for a batcher having a scale beam, the combination of a pendulum shaft, means actuated by pull from said scale beam for applying torque to said shaft at a constant radius, a pendulum on said pendulum shaft for increasingly applying a countertorque upon deflection of said pendulum from an initial position of rest, a crank on said shaft for rotation in unison with said pendulum, a push rod pivotally supported at one end by said crank and extending away from the latter in a direction which is generally perpendicular to said crank with the latter in its initial position, a push rod block pivoted to the other end of said rod, a dial rod mounted in said push rod block and extending generally parallel to said push rod, and a rack on said dial rod for operating a dial indicator.

20. In a control mechanism for a batcher for the proportioning of concrete constituents having a plurality of scales and a cut-off device for stopping the flow of a constituent to each of said scales, the combination comprising a plurality of actuating devices for said cut-off devices and individually responsive to the weights on respective ones of the scales, means including a first set of adjustable stops for presetting each of said actuating devices to respond to respective weights to effect the delivery of constituents in a batch having predetermined proportions, said means including additional sets of stops to cause said actuating devices to respond to weights corresponding to batches of concrete having other proportions, and manually operated selector means acting on each of said actuating devices simultaneously for causing a desired one of said sets of stops to be effective.

21. A control device for a batcher for bulk materials having a plurality of scales and cut-off devices for stopping the flow of material to each of said scales, the combination comprising electric switches for controlling said cut-off devices, switch operators, linkages for causing said switch operators to move toward and away from respective ones of said switches for operating the same, said linkages being associated with said scales respectively for displacement in accordance with the weight of material thereon and for operating said switches upon reaching predetermined displacements, indicators for indicating the amounts of such displacement, said operators having a lost motion connection so that upon exceeding said predetermined displacement of the associated linkage additional movement of the linkage may take place free of any mechanical load on the linkage thereby to enable accurate indication of weight on said indicators in spite of overloading the scales beyond the cut-off points corresponding to said predetermined linkage displacements.

22. A control station for use with a batching scale and a cut-off device for stopping the flow of material to said batching scale comprising, in combination, means including a linkage movable by said scale in proportion to the weight of the material deposited thereon, a switch mechanism associated with said linkage and arranged to be actuated by said linkage upon the latter moving through a predetermined displacement, said switch mechanism including a series of positioning stops and a stop engaging member for cooperating therewith, means for selecting one of said stops to cause said switch to operate when a corresponding predetermined weight of material is on said scale, and means operated by said selector means for causing temporary relative retraction of said stop engaging member thereby obviating engagement between one of said stops and said stop engaging member during selection of the desired stop.

23. In a control mechanism for a batcher having a scale beam and a material cut-off device, the combination of a switch for controlling said cut-off device, a switch operator, means for connecting said switch operator to the scale beam for actuation thereby, means supporting said switch for bodily adjusting movement relative to said operator in a direction parallel to the latter's path of travel, a member having a plurality of stops thereon for positioning said switch supporting means in a predetermined position with respect to said switch operator and means for positioning said stop member to bring a selected one of said stops into operative engagement with supporting means.

24. A control device for a batcher for bulk materials having a plurality of scales and cut-off devices for stopping the flow of material to each of said scales, the combination comprising electric switches for controlling said cut-off devices, linkages associated with said scales respectively for displacement in accordance with the weights of material thereon, indicators for continuously indicating the amounts of such displacement, each switch having a weight for maintaining it in the condition corresponding to material discharge, each of said weights being normally free of force-transmitting engagement with the corresponding linkage but arranged in the path of movement of such corresponding linkage so that upon the linkage reaching a predetermined displacement the associated weight is lifted from its switch for operation of the same and so that movement of the linkage either side of the point of switch operation may take place free of loading effect on said linkage and consequent error in the reading of the associated indicator.

25. In a batcher for weighing out a plurality of bulk materials to form batches of desired composition, the combination comprising a plurality of scales, cut-off devices for stopping the flow of material to each of said scales respectively, linkages coupled to each of said scales for movement in accordance with the weight on the scale, a switch arranged for operation by each of said linkages and having contacts for connection to the associated cut-off device, each of said switches having in addition a positionable member for predetermining the point of linkage displacement at which operation of the contacts and cut-off of material takes place, and means including a manually settable member for simultaneously positioning the positionable members of each of said switches so that materials are weighed out in predetermined ratio.

26. In a batcher for weighing out a plurality of bulk materials to form batches of desired composition, the combination comprising a plurality of scales, cut-off devices for stopping the flow of material to each of said scales respectively, linkages coupled to each of said scales for movement in accordance with the weight on the scale, a switch associated with each of said linkages, said switches each including relatively movable contacts and means for biasing the same toward one another, each of said switches having a switch operator coupled for movement with the respective linkage for permitting the contacts to close under the force of bias when the weight on the associated scale is below a predetermined amount but opening the contacts when the weight reaches a predetermined amount, and circuit connections between said switch and the associated cut-off device so that material flows when the circuit is made and is cut off when the circuit is broken thereby to insure that the condition of cut-off will automatically exist in the event that the contacts are prevented from touching due to the entry of dirt or other foreign material between them.

27. In a control mechanism for a batcher having a scale, the combination of a contact-carrying member having an electrical contact, a movable actuating member for said contact, means for coupling said actuating member to said scale for movement therewith in accordance with the weight on the scale, means mounting said contact-carrying member for bodily displacement relative to said actuating member, stop means carrying a plurality of adjustable abutments thereon and mounted for shifting movement so that a selected abutment may be moved into active position in the path of movement of the contact-carrying member, and manual means for moving said stop means to shift one of said abutments out of active position and to bring another of said abutments into said active position thereby to predetermine the operation of said contact at a weight on the scale which corresponds to a pre-selected magnitude.

28. In a batcher for weighing out a plurality of bulk materials to form batches of desired composition, the combination comprising a plurality of scales, cut-off devices for stopping the flow of material to each of said scales respectively, linkages coupled to each of said scales for movement in accordance with the weight on the scale, a switch arranged for operation by each of said linkages and having contacts connected to the associated cut-off device, each of said switches having in addition a positionable member for predetermining the point of linkage displacement at which operation of the contacts and therefore cut-off of material takes place, a first set of adjustable abutments in engagement with corresponding ones of said positionable members for simultaneously positioning each of them, a second set of adjustable abutments, and means including a manual selector for shifting said first set of abutments out of engagement with said positioning members and for shifting said second set of abutments into engagement with said positioning members to change the ratio of the material constituting the batch.

EDWIN O. MARTINSON.

REFERENCES CITED

The following references are of record in the file of this patent:

UNITED STATES PATENTS

| Number | Name | Date |
|---|---|---|
| 399,192 | Gill | Mar. 5, 1889 |
| 1,328,319 | Crane | Jan. 20, 1920 |
| 1,957,198 | Bryce | May 1, 1934 |
| 1,979,822 | Cameron | Nov. 6, 1934 |
| 2,066,763 | Bryce | Jan. 5, 1937 |
| 2,208,284 | Weckerly | July 16, 1940 |
| 2,352,114 | Muskat | June 20, 1944 |